June 6, 1967     C. T. VON HOLTZ     3,324,448
ELECTRICAL WIRING DEVICE HAVING AN IMPROVED CORD CLAMP
Filed Feb. 10, 1965
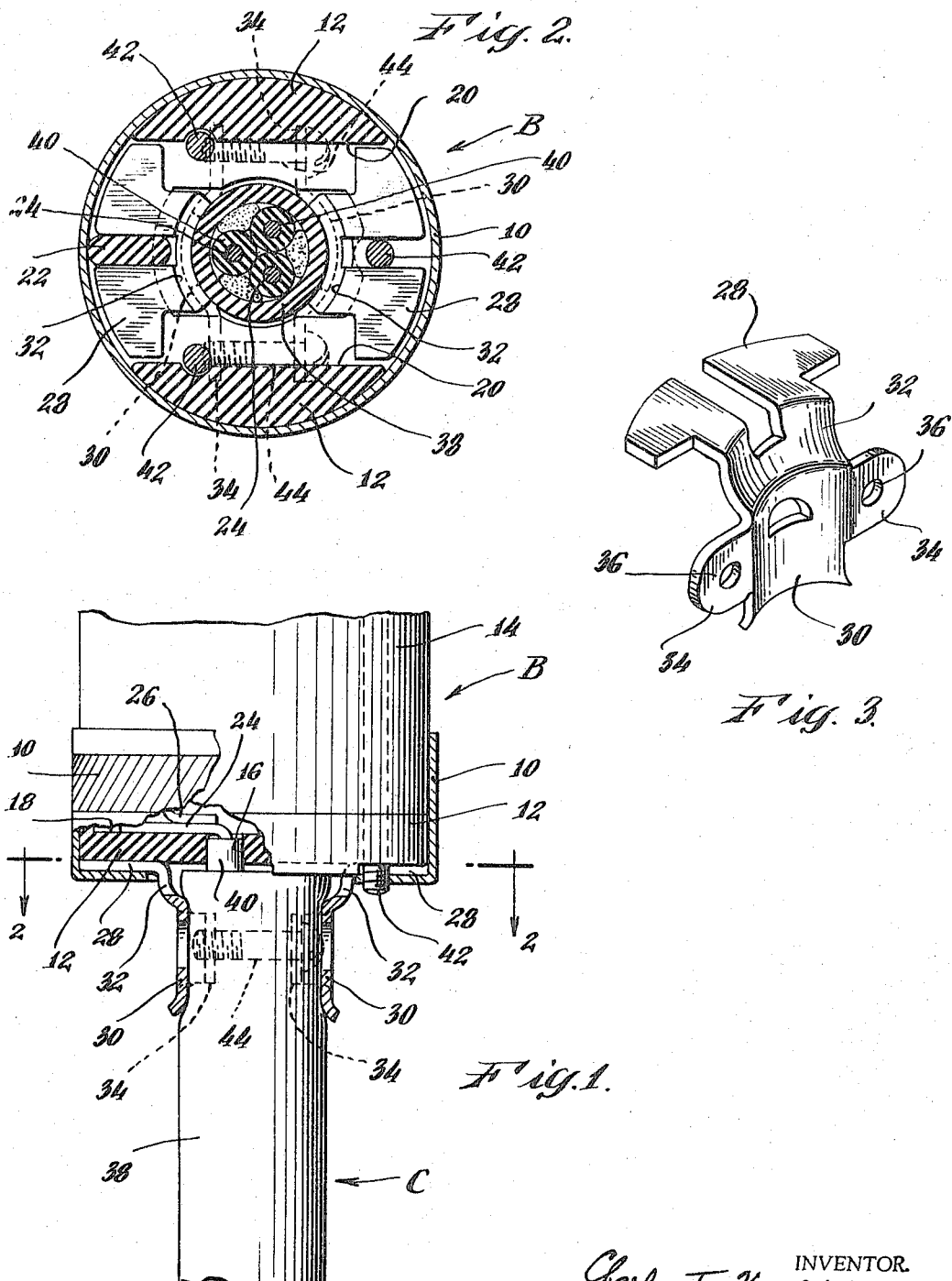
INVENTOR.
Charles T. Von Holtz
BY
Wooster, Davis & Cifelli
ATTORNEYS.

United States Patent Office 3,324,448
Patented June 6, 1967

3,324,448
ELECTRICAL WIRING DEVICE HAVING AN
IMPROVED CORD CLAMP
Charles Theodore Von Holtz, Bridgeport, Conn., assignor to Harvey Hubbell, Incorporated, Bridgeport, Conn., a corporation of Connecticut
Filed Feb. 10, 1965, Ser. No. 431,622
6 Claims. (Cl. 339—103)

This invention relates to an electrical wiring device having an improved cord clamp and, more particularly, to such a clamp which is adapted for use with electrical cord connectors.

Cord clamps are widely used for mechanically securing electrical cords to electrical wiring devices, such as cord connector members, i.e. bodies and caps, and also functioning as a strain relief for the cord. Although cord clamps may differ somewhat in structural detail, they are customarily formed by two generally L-shaped clamp members, each comprising a foot and a clamping portion. The foot of each clamp member is substantially planar and is slidably secured in a radial slot formed in the body of the connector member. The two clamp members are mounted in opposed relationship to one another so that the feet extend in radially opposite directions on either side of the electrical cord. The clamping portion of each clamp member is generally normal to its foot and is slightly curved so as to conform to the round surface of the electrical cord. Each clamp member also usually includes a laterally extending ear on each side of the clamping portion and these ears include openings for receiving clamp member securing and tightening screws. Each screw extends freely through a plain opening in an ear of one clamp and threadedly engages an aligned threaded opening in an ear of the other clamp. Tightening of the screws causes the two clamp members to be drawn together and the feet to slide in the slots, clamping the cord between the clamping portions.

When an electrical cord is prepared for connection to an electrical connector, the usual resilient insulating outer covering or jacket is girdled by a circumferential cut and a portion thereof removed from the end of the cord to expose the individual conductors. The ends of the individual conductors are then stripped of their individual jackets to bare them and connected to the electrical terminals of the wiring device. The electrical cord is placed in the clamp in such a manner that the end of its jacket is disposed between the clamping portions of the L-shaped cord clamp members. This wiring procedure creates two problems in practice which are desirable to be overcome. One of these problems is that because the end of the cord jacket compressed between the clamping portions is of uniform cross-section, it may be pulled out of the clamp by exerting sufficient pulling force on the cord, which can occur in usage. The second problem is that the electrician, in girdling the cord jacket, may inadvertently cut too deep and penetrate the insulation of an individual conductor, thereby permitting the clamping portion of a clamp member to be quite close to an individual conductor, causing an accidental ground or short circuit.

Accordingly, it is the primary object of this invention to provide an improved cord clamp for electrical cord connectors. Other objects are to provide such a cord clamp which has improved gripping capabilities and which is less subject to grounding or short-circuiting of the electrical conductors. Other objects and advantages will be more apparent from the following description, the appended claims, and the figures of the attached drawings wherein:

FIG. 1 is a side elevational view of an electrical cord connector body having a cord clamp in accordance with this invention, portions thereof being broken away and shown in section for clarity;

FIG. 2 is a cross sectional view taken substantially along the line 2—2 of FIG. 1; and FIG. 3 is a perspective view of one of the clamp members of a cord clamp embodying the present invention.

The objects of the invention are achieved in one form by a cord clamp wherein each of the clamping members is formed providing a foot, a clamping portion generally normal thereto and a belled portion at the juncture of the foot and clamping portion.

In the drawings, the invention is illustrated as embodied in an electrical cord connector body; however, it may be incorporated into electrical cord caps and other electrical wiring devices.

In FIGS. 1 and 2 there is illustrated a connector body B including a shallow annular metallic skirt 10 enclosing a circular rear body portion 12 and the rearward end of a forward body portion 14. The body portions 12 and 14 are chambered and recessed to receive the usual electrical contact-terminal members in accordance with usual practice. The rear body portion 12 defines a plurality of conductor openings 16, each of which communicates with a radial recess 18 in its forward surface. The rear surface of body portion 12 defines a wide diametrical groove 20. Extending upwardly from the bottom of groove 20 and positioned at one side of the conductor openings 16 is a guide rib 22. Each of the conductors 24 of an electrical cord C extends through a conductor opening 16 and is bent radially outwardly to lie in one of the radial recesses 18 where it contacts a current-carrying contact-terminal member 26 mounted in the forward body portion 14.

The cord clamp of the invention is formed by two opposed clamp members of the type shown in FIG. 3. Each of these clamp members includes a flat bifurcated foot 28 and a semi-cylindrical cord-clamping portion 30, the foot and the cord-clamping portion being generally normal to each other and joined by a belled portion 32. Ears 34 extend outwardly from the cord-clamping portion 30 and define screw-receiving openings 36 therein.

In wiring a connector body of the type illustrated in FIGS. 1 and 2, a portion of the outer jacket 38 of the cord C of resilient insulation material is removed to expose the individual conductors 24 with their individual insulation 40. The cord is passed through a central opening in the end wall of skirt 10 between the clamping portions 30. The ends of the conductors, stripped of insulation 40, are individually inserted through the openings 16 in the rear body portion 12. The skirt 10, having the cord clamp members inserted therein as shown in FIG. 1, is then moved against the rear body portion 12 and the forward body portion 14 is inserted into the open end of skirt 10. When these elements are joined, the foot 28 of each clamp member is positioned within the groove 20, and the guide rib 22 is positioned within the bifurcation of the foot 28 of the left hand cord clamp member as seen in FIG. 2. Screws 42 extend through the entire assembly of body portions and are threadedly anchored in tapped openings in the end wall of the skirt 10, one of the screws passing through the bifurcation in the right hand cord clamp member, as shown in FIG. 2. Upon tightening these screws, the current carrying contact-terminal members 26 are tightly pressed against the conductors 24 to effect electrical connection, and the entire assembly is mechanically rigid, with the exception of the cord clamp members which are radially movable within the groove 20. This movement is controlled by the feet 28 being guided on rib 22 and one of the screws 42. Clamping screws 44 are then inserted through the plain openings in the ears 34 of the right hand cord clamp member and threadedly anchored in threaded openings 36 in the ears 34 of the left hand cord clamp member, as viewed in FIG. 1. Tightening of these screws draws the clamp members together and compresses the outer jacket 38 of the cord C, as shown in FIG. 1. An end portion of the jacket 38 extends beyond the cord clamping portion 30 and into the belled portion 32, and bulges within the belled portion, as illustrated. This bulge serves an important function, as it forms an interlock with the clamp which greatly increases the force required to pull the cord C out from the cord clamp. An additional advantage results from the increased clearance obtained between the clamp members and individual conductors. For example, by reference to FIG. 1, at the time the jacket 38 is cut through to expose the individual conductors 24, the electrician may inadvertently cut into the insulation jacket 40 of one or more of the conductors 24. When using the old-style cord clamp, this could create a potentially dangerous condition by virtue of the usual angle of the L juncture of the cord clamp foot and clamping portion being too close to the exposed conductor with the possibility of an inadvertent short circuit. However, the belled portion 32 of the improved clamping members substantially increases the clearance and, thus, the safety factor of the cord clamp is enhanced by minimizing the possibility of short-circuiting.

It will be apparent that a number of variations and modifications may be made in this invention without departing from its true spirit and scope. Accordingly, the foregoing description is to be construed as illustrative only, rather than limiting. This invention is limited only by the scope of the followng claims.

What I claim as new and desire to secure by Letters Patent of the United States is:

1. In a cord clamp for an electrical wiring device including first and second opposed clamp members, the improvement wherein each clamp member comprises: a cord-clamping portion disposable against the side of a cord to be clamped; a foot portion angularly positioned relative to said cord-clamping portion and arranged to be slidably retained in the wiring device for movement toward and away from the cord; a belled portion interconnecting said cord-clamping portion and said foot portion and curving outwardly from the intersection of a plane containing said foot portion and the extended surface of said cord-clamping portion; and means for drawing the cord-clamping portions of said first and second members against the cord.

2. The cord clamp of claim 1 wherein said foot portion is substantially planar.

3. The cord clamp of claim 2 wherein the angle between said cord-clamping portion and the plane of said foot portion is approximately 90°.

4. The cord clamp of claim 1 wherein said cord-clamping portion is curved to at least partially conform to the outer surface of the cord.

5. A cord clamping member for an electrical wiring device which comprises: a curved cord-clamping portion disposable against the side of a cord to be clamped and including screw-receiving ears extending outwardly of said cord-clamping portion; a planar foot portion extending outwardly from the convex side of said cord clamping portion; and a belled portion interconnecting said cord clamping portion and said foot portion and curving outwardly from the intersection of the plane containing said foot portion and the extended surface of said cord clamping portion.

6. The cord clamping member of claim 5 wherein the angle between said plane and the longitudinal axis of said cord clamping portion is approximately 90°.

References Cited

UNITED STATES PATENTS

| | | | |
|---|---|---|---|
| 2,219,940 | 10/1940 | Ritz-Woller | 339—103 |
| 2,704,833 | 3/1955 | Heller | 339—103 X |
| 3,056,944 | 10/1962 | Sundquist | 339—103 X |
| 3,200,365 | 8/1965 | Carpinone | 339—103 |

FOREIGN PATENTS

| | | |
|---|---|---|
| 654,004 | 12/1962 | Canada. |

MARVIN A. CHAMPION, *Primary Examiner.*

ALFRED S. TRASK, RICHARD E. MOORE, *Examiners.*